June 12, 1928.
C. M. CRONKHITE
1,673,230
RECOIL OR SNUBBING MECHANISM
Filed Aug. 18, 1925
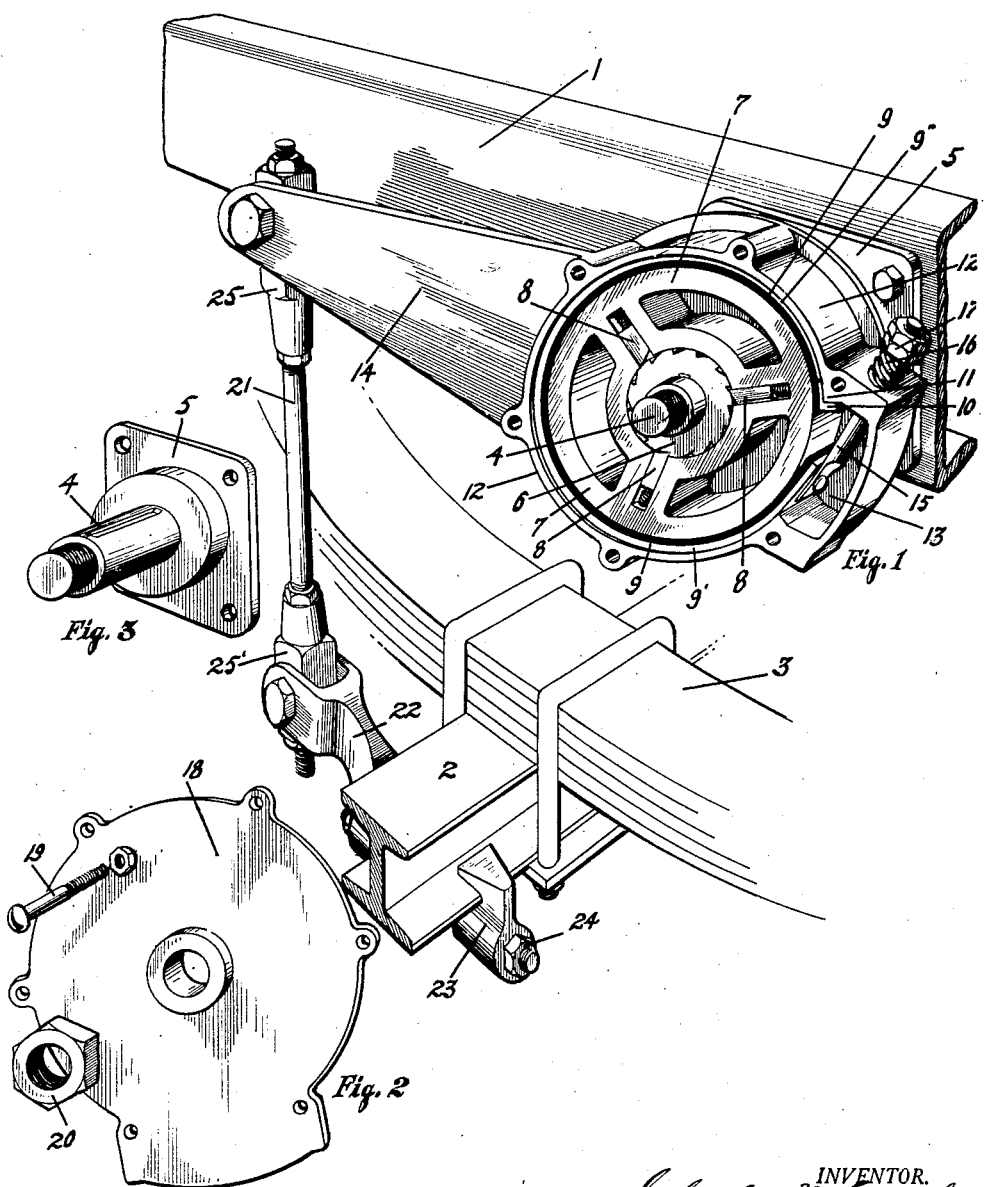
INVENTOR.
Charles M. Cronkhite
BY
ATTORNEY Patented June 12, 1928.

1,673,230

UNITED STATES PATENT OFFICE.

CHARLES M. CRONKHITE, OF GLENDALE, CALIFORNIA.

RECOIL OR SNUBBING MECHANISM.

Application filed August 18, 1925. Serial No. 50,918.

My invention relates to a mechanism to be attached to an automobile or other spring vehicle for the purpose of preventing recoil or rebound after the body of the vehicle has been suddenly depressed, as in running over a bump or depression in the roadway, and it has among its salient objects to provide a simple, practical and economical device which can be applied to vehicles with a minimum of effort and expense and which in its operation permits the body of the vehicle to move downwardly under the sudden action, but with a combination ratchet and friction action holds the body to a slower and easier upward movement, thus preventing that most undesirable rebound which throws a person out of the seat and sometimes causes injury to the individual.

In order to illustrate my invention and explain the principle thereof, I have shown on the accompanying sheet of drawings one practical embodiment thereof, which I will now describe. In the drawings,—

Figure 1 is a fragmentary view of the body supporting frame, spring and axle of a vehicle, showing my device applied thereto, with cover removed to show the interior thereof;

Figure 2 is a view of the cover, nut and bolts for securing the same in place thereon; and Figure 3 is a perspective view of the fixed bearing member which is secured to the frame member of the body.

Referring now in detail to the drawings, I will describe the particular form of my invention here illustrated. 1 designates the frame member or part of the chassis of the vehicle, 2 the axle, and 3 the usual supporting spring for the body of the vehicle.

Mounted to said frame member 1, is a bearing member, 4, having the attaching flange 5, by means of which it is secured to said frame member. Keyed to said bearing member 4, is a toothed ratchet member, 6. Mounted around said ratchet member is a ratchet collar, 7, having radially positioned therein, spring 7 pressed plunger dogs, 8, 8, the inner ends of which are adapted to engage with said ratchet teeth, as indicated, but it will be seen that they are so positioned relative to said teeth that but one of said dogs is in full mesh with its tooth at once, thus making provision for a minimum movement before full engagement of one of said dogs with said ratchet member 6. Around said ratchet collar, 7, which is shown as having a smooth periphery, is a flexible friction element, such as leather, or other suitable material, designated 9, and secured to an open ring member, 9', provided at one end with a radial flange-like member, 10, which fits around the corner, 11, of a body member, 12, having the pocket, 13, formed therein, at one end, and at its other end provided with an arm, 14, as clearly shown. The other end of said ring member 9', is provided with a bolt, 15, extended out through said pocket wall and provided on the outside of said body member 12, with a coiled spring, 16, and nut 17, as shown. Thus the open ring member, 9', and its friction lining 9, can be tightened to yieldingly embrace said ratchet collar, 7, as will be clear from the showing made in the drawings. The body or housing, 12, is provided with a cover, as 18, secured in place by means of bolts, as 19, with a nut 20, on the outer end of said bearing member 4, as indicated.

The outer end of the arm, 14, is connected by means of a link, 21, to a bracket 22, secured to the axle, 2, by means of a clamp 23, and nut 24. The connection of the ends of said link, 21, is made adjustable by means of adjustment nuts, as 25 and 25', whereby the right connections can be made. The connections are also such as to permit free movement at the connections, as the body of the vehicle moves relative to the axle thereof.

It will be noticed that the connection from the bracket 22, through the link, 21, to the outer end of the arm, 14, is fixed and that as the body of the vehicle moves downwardly, the body member 12, pivots around its pivotal connection at the outer end of the arm, 14, to said link. This movement causes a certain relative rotative movement of the body member 12, the ring member 9', and its lining 9, and the ratchet ring or collar 7, around the ratchet member 6, which is keyed against turning to the bearing member 4, which moves with the frame member 1, up and down. As the body of the vehicle starts upwardly, after a quick movement downwardly, this rotative movement is in the opposite direction, and consequently the ratchet dogs act and the ratchet collar 7, being held against turning, is permitted to move under the friction of the member 9, with the periphery surface of said collar member 7, as will be understood from the drawings.

Thus it will be seen that there is a combination friction and ratchet mechanisms co-operating together to permit free downward movement, but to hold the parts to a slow friction and spring yielding movement to normal position, as the coiled spring 16 operates on the open ring and friction member 8, to cause them to frictionally and yieldingly hug said ratchet collar 7.

I do not limit my invention to the showing made for illustrative purposes, except as I may be limited by the hereto appended claims.

I claim:

1. A recoil mechanism comprising a member adapted for rotative movement on a vehicle frame, a second member rotatable on the first member, a split braking element interposed between the members and fixed against rotation relatively to the second member, means for connecting the second member to the vehicle axle in such manner as to be rotated in one direction or the other according as the vehicle frame moves upwardly or downwardly, means for locking the first member against rotation in such direction that as the vehicle frame moves upwardly, the braking element will have braking engagement with the member to retard the upward movement of the vehicle frame, a bolt fixed to one end of the braking element, an adjusting nut on the bolt, and a spring on the bolt interposed between the second member and nut and acting to constrict the braking element into braking engagement with the first member.

2. A recoil mechanism comprising a bearing member adapted to be fixed to the frame of a vehicle, a ratchet member fixed to the bearing member, a collar rotatable on said ratchet member, a plurality of radially positioned pawls slidably mounted in the collar, means for normally urging the pawls into engagement with the teeth of the ratchet member so as to permit rotation of the collar in one direction only, a body member rotatably mounted on the collar and having means by which the body member is adapted to be operatively connected to the axle of the vehicle so that as the frame moves upwardly or downwardly the body member will accordingly be partially rotated in one direction or the other, a pocket formed in the body member, a split braking ring interposed between the collar and body and having a brake lining on its inner periphery for engagement with the collar, one end of said ring being angularly disposed and engaging the wall of said pocket, the other end of the ring extending into the pocket, a bolt secured to the other end of the ring and extending through the body member to a point exteriorly thereof, an adjusting nut on the bolt, and a coil spring on the bolt interposed between the member and nut and acting to constrict the braking ring into braking engagement with the collar.

3. A recoil mechanism comprising a bearing member adapted to be fixed to the frame of a vehicle, a ratchet member fixed to the bearing member, a collar comprising a hub portion rotatably mounted on the ratchet member, a rim portion and a plurality of radially disposed webs connecting the portions and having radially disposed recesses, pawls slidably mounted in the recesses and normally urged into engagement with the teeth of the ratchet member, a body member rotatably mounted on the collar and having means by which it is adapted to be operatively connected to the axle of the vehicle so that as the frame moves upwardly or downwardly, the body member will accordingly be partially rotated in one direction or the other, and a split braking ring connected to the body member and interposed between the latter and collar and having braking engagement with the collar.

Signed at Los Angeles, Los Angeles County, California, this 12th day of August, 1925.

CHARLES M. CRONKHITE.